United States Patent
Balageas et al.

(10) Patent No.: US 9,439,140 B2
(45) Date of Patent: Sep. 6, 2016

(54) METHOD FOR MANAGING THE STATE OF MICRO BASE STATIONS BY FOLLOWING THE VARIATIONS OF TRAFFIC REQUIREMENTS, AND ASSOCIATED CONTROLLER DEVICE

(75) Inventors: Carine Balageas, Nozay (FR); Vinod Kumar, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 99 days.

(21) Appl. No.: 14/111,901

(22) PCT Filed: Apr. 11, 2012

(86) PCT No.: PCT/EP2012/056512
§ 371 (c)(1),
(2), (4) Date: Jan. 23, 2014

(87) PCT Pub. No.: WO2012/140037
PCT Pub. Date: Oct. 18, 2012

(65) Prior Publication Data
US 2014/0155078 A1    Jun. 5, 2014

(30) Foreign Application Priority Data

Apr. 14, 2011 (EP) .................................... 11305445

(51) Int. Cl.
*H04W 36/00* (2009.01)
*H04W 52/02* (2009.01)
(Continued)

(52) U.S. Cl.
CPC ......... *H04W 52/0206* (2013.01); *H04W 24/02* (2013.01); *H04W 28/16* (2013.01); *H04W 52/0274* (2013.01); *H04W 36/04* (2013.01); *H04W 84/045* (2013.01); *H04W 88/08* (2013.01)

(58) Field of Classification Search
CPC . H04W 84/045; H04W 24/02; H04W 88/08; H04W 36/04
USPC ...................... 455/422.1, 434, 444, 443, 458
See application file for complete search history.

(56) References Cited

U.S. PATENT DOCUMENTS

2011/0237257 A1* 9/2011 Soliman et al. .............. 455/436
2012/0106423 A1* 5/2012 Nylander et al. ............. 370/311

FOREIGN PATENT DOCUMENTS

| GB | 2 378 089 A | 1/2003 |
| WO | WO 2009/115554 A1 | 9/2009 |
| WO | WO 2010/151186 A1 | 12/2010 |

OTHER PUBLICATIONS

"3rd Generation Partnership Project; Technical Specification Group Services and System Aspects; Telecommunication management; Study on Energy Savings Management (ESM) (Release 9)," 3GPP TR 32.826 V2.0.0., XP050440209, pp. 1-33, Mar. 2010.

(Continued)

*Primary Examiner* — Charles Appiah
*Assistant Examiner* — Jaime Holliday
(74) *Attorney, Agent, or Firm* — Fay Sharpe LLP

(57) ABSTRACT

A method manages the state of a plurality of micro base stations inside a mobile communication network. The network comprises at least a macro cell containing at least one Tracking Area covering a plurality of micro cells each one associated with a micro base station. The method to manage the states of micro cells comprises the steps of: switching on of all the micro base stations contained in said Tracking Area of the macro cell, counting of the messages of paging to determine the number of portable devices in Idle mode inside said Tracking Area, and switching off at least one micro base station in the Tracking Area when the number of portable devices in Idle mode in the said Tracking Area is lower than a first determined value. According to an improvement, the switching on of all the micro base stations contained in a Tracking Area is triggered when the current load of the macro cell exceeds a second determined value.

11 Claims, 3 Drawing Sheets

(51) Int. Cl.
*H04W 24/02* (2009.01)
*H04W 28/16* (2009.01)
*H04W 88/08* (2009.01)
*H04W 84/04* (2009.01)
*H04W 36/04* (2009.01)

(56) References Cited

OTHER PUBLICATIONS

International Search Report for PCT/EP2012/056512 dated May 30, 2012.

* cited by examiner

Micro cells of the macro cell are in different Tracking Areas

TA1:
TA 2:
TA3:

All micro cells of the macro cell are in the same Tracking Area

METHOD FOR MANAGING THE STATE OF
MICRO BASE STATIONS BY FOLLOWING
THE VARIATIONS OF TRAFFIC
REQUIREMENTS, AND ASSOCIATED
CONTROLLER DEVICE

FIELD OF THE INVENTION

The invention relates generally to telecommunication systems and in particular to a method for energy saving at the level of base station, and associated controller device. Specifically, in case of cellular networks, it is proposed to switch on/off selected cells to follow the variations in traffic load.

BACKGROUND OF THE INVENTION

A mobile communication network comprises portable devices, such as cell phone, in radio communication with fixed base stations. These base stations comprise in particular antennas having a more or less large coverage. The coverage areas depend amongst other things on the emission power. The macro cell covers a broad area and may communicate with a large number of portable devices, whereas the micro cell cover a small cover and can manage a small number of portable devices. The radio network is thus arranged hierarchically: the macro cell ensures the coverage of a large area and the micro cell ensures a high capacity of communication with the cell phones. According to the characteristics of the area and in particular of the population density and it is advantageous to increase the number of micro cells in order to offer a better capacity in this area.

The radio coverage of each micro cell is managed by a device called "eNodeB" in the Long Term Evolution (LTE) technology. This device consumes energy. In certain cases, the eNodeB is switched on but does not manage any communication with portable device, for example during the night in residential zone, when the activity of the portables is very limited. Most of time and power of the eNodeB are thus consumed for nothing.

To save energy during low load period, it seems relevant to switch off cells—for example one or multiple micro cells are switched-off while the macro cells remain intact in order to avoid any coverage holes. In dense deployments, the number of unused micro cells being high, such solutions can lead to substantial energy savings. This will introduce a decrease of available network capacity. An important issue is to decide which micro cells to switch off such that coverage areas with mobile subscribers do not suffer from an undue reduction of capacity. Inversely, when the need for capacity increases, we need also to decide which micro cell to switch on to provide required capacity.

A solution consists in the macro cell managing all the portable devices when the traffic is low. However, the capacity of the macro cell can very quickly become insufficient when the portable devices in Idle mode become active, i.e. when they enter into communication. Another solution consists in switching on uniformly one micro cell out of two, one out of three etc. . . . , proportionally to the actual traffic load. But this empirical method may cause call drops and low quality of service in the radio communication network. The problem when choosing the cell to switch off using actual traffic load generated by the "active users" is that the reduced capacity may be not enough to serve portable devices in Idle mode already attached to this cell that when such UEs become active.

When the portable device is in Idle mode, it is difficult to locate it because it does not emit signal. It is easy to count the number of cell phones in active mode, but it is difficult to determine the number of portable device in Idle mode per base station . . . . In fact, the idle mode procedure implemented in the LTE standard does not permit to know how many terminals in idle mode are under the coverage of a given eNodeB. In fact the portable device is registered to the MME and the eNodeB has no context information. The only geographical information we have on the terminal is at the granularity of the Tracking Area, as the portable device performs Tracking Area updates when moving and also periodically when not moving. The radio network cannot decide optimum number of switched on micro cell in order to offer a sufficient capacity for the active portable devices and the portable devices in Idle mode which could wake-up This granularity of the Tracking Areas doesn't give enough information of the number of UEs in idle mode under the coverage of an eNodeB.

The present invention allows among others advantages of estimating the number of portable devices within a zone and of determining the number of switched on micro cells to ensure the potential requests for traffic

SUMMARY OF THE INVENTION

An aspect of the invention relates to a method to manage the state of a plurality of micro base stations inside a mobile communication network is provided. The network comprises at least a macro cell containing at least one Tracking Area covering a plurality of micro cells associated with a micro base station. The method includes the steps of:
   switching on of all the micro base stations contained in said Tracking Area of the macro cell,
   counting of the messages of paging to determine the number of portable devices in Idle mode inside said Tracking Area,
   switching off at least one micro base station in the Tracking Area when the number of portable devices in Idle mode in the said Tracking Area is lower than a first determined value.

With this manner, the number of micro base stations in active mode is optimized, and thus the global power consumption of all micro base stations inside a macro cell is decreased and the time of use of micro base station is limited. The method allows taking switch on/off decisions of micro cells based on potential needs for traffic information, Typically, the number of user terminals in idle mode in a given geographical area permits to evaluate what would be the potential needs for traffic. The present invention uses location area update and paging activity information to predict cell by cell traffic requirements. Hence, information of location and number of idle mode terminals becomes useful to simply anticipate needs for traffic.

According to another aspect of the present invention, the switching on of all the micro base stations contained in said Tracking Area of the macro cell is triggered when the current load of the macro cell exceeds a second determined value. It happens when the macro is detecting an increase of traffic, e.g. high number of connection requests, typically when lot of terminals are attached to the macro if most of micros are switched off.

According to another aspect of the present invention, the switching off of at least one micro base station is performed when the estimated number of portable devices in Idle mode managed by this micro base station is lower than a third determined value. This way, only micro cells with less probable traffic will be switched off for energy reasons. Then, even if the capacity is reduced, it will not impact the service quality. Similarly, this information on paging activity can also used to switch on a cell expected to have a large number of terminal in Idle modes, which could "potentially" wake up and need for traffic.

According to another aspect of the present invention, the number of portable devices managed by this micro base station takes into account the information of localization provided by applicative servers in communication with the portable devices located in the micro cell. With this manner, the portable devices are better located and the number of portable devices in Idle mode in each micro cell is better estimated.

According to another aspect of the present invention, the macro cell contains only one Tracking Area. With this manner, the processing for determining the number of portable device per micro base station is only based on estimation at the micro base station level.

According to a variant of the present invention, the macro cell contains several Tracking Areas; the step of switching on all the micro base stations contained in the Tracking Areas is successively performed for each Tracking Area. With this manner, the processing for determining the number of portable device has a better granularity.

According to a variant of the present invention, the switching on of all the micro base stations contained in said Tracking Area is periodically performed, spaced by a regular time interval. With this manner, it is possible to periodically update the number of switched-on micro base station.

The present invention also relates to a controller of mobile communication network controlling the traffic inside a macro cell comprising means of communication with a plurality of micro base stations associated with a micro cell, the macro cell containing at least one Tracking Area covering a plurality of micro cell, characterized in that said controller comprises:
  means of emission of a first signal to switch on all micro base stations in said Tracking Area,
  a counter of messages of paging to determine the number of portable devices in Idle mode inside said Tracking Area of the macro cell,
  means of emission of a second signal to switch off at least one micro base station of said Tracking Area when the number of portable devices in Idle mode inside said Tracking Area is lower than a first determined value.

The present invention also relates to a computer program product comprising instructions for performing the steps of the method as claimed when the program is executed on a network controller.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

In particular, the invention is applicable to several radio access technologies such as: GSM, WCDMA, LTE. According to each technology, a radio base station (or radio access node), such as a Base Transceiver Station (BTS) for the Global System Mobility (GSM) standard, or a NodeB for Universal Mobile Telephone System (UMTS) standard, or an eNodeB for Long Term Evolution (LTE) standard, communicates with portable devices, such as mobile phones, PDAs or laptops equipped with radio module. The portable device communicates with a macro base station located within a range of a few kilometers; the area covered by such a base station is referred to as a macro cell. In a macro cell, the micro base stations associated with the micro cells ensures a high capacity of communication with the portable devices. After this paragraph, we detail this invention by using the LTE technology.

Figure 1:
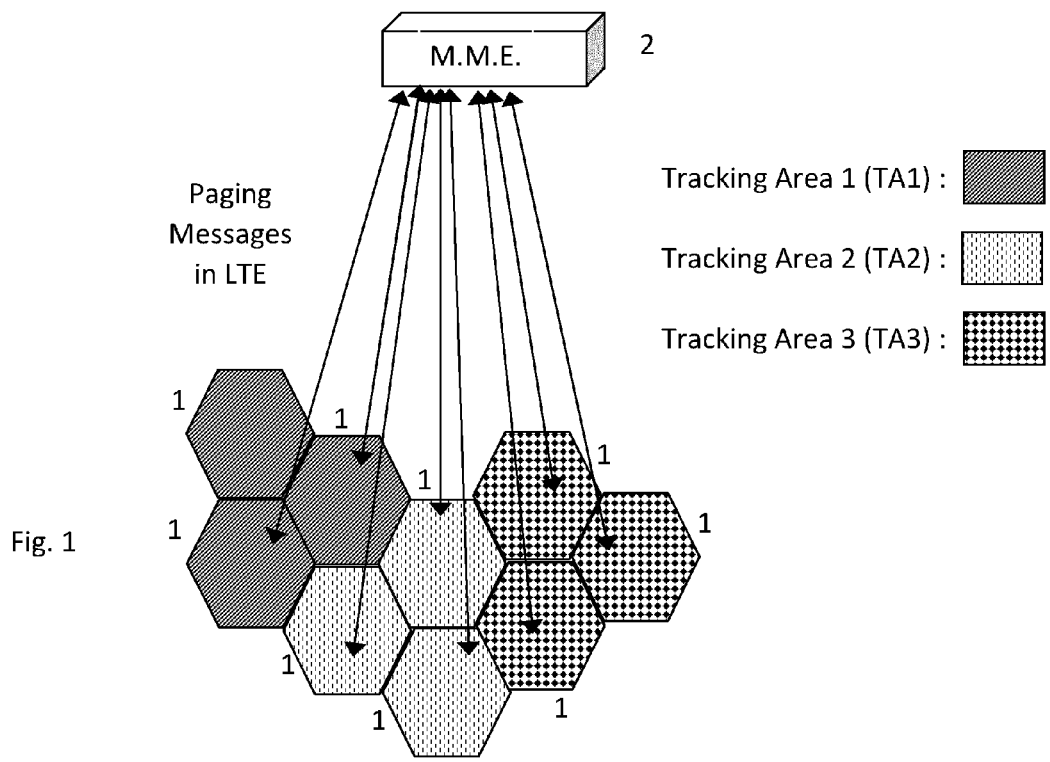
FIG. 1 illustrates a set of three zones of Paging, called "Tracking Area" or TA in LTE technology.

FIG. 1 illustrates a set of three zones of Paging, called "Tracking Area" or TA in LTE technology. The Tracking Area comprises a plurality of micro cells 1. Three micro cells by Tracking Area are represented in the FIG. 1, this number may be variable per Tracking Area. A network element called Mobile Management Entity 2 (or MME) communicates with each micro cell and manages in its memory the identity of the portable device present in each Tracking Area, among other information.

Standard LTE paging procedure gives only information at the granularity of the Tracking Area. To have information at the micro base station level (i.e. at an eNodeB level in LTE technology), we use Random Access messages sent by the terminals that exit idle mode when having been paged for an incoming call, or when performing a Tracking Area Update during mobility in idle mode. These messages are sent toward a given eNodeB and thus can be used as more accurate location information than the classical paging messages, i.e. at the eNodeB granularity instead of Tracking Area granularity When a portable device leaves or enters in a given Tracking Area (TA), a communication arises with the micro cell and the portable device can be located at this time. LTE specification well defines "Random Access messages" sent by the portable devices in Idle mode when they become active because of incoming call or when they change Tracking Area. The LTE random access procedure is used when there is a transition from RRC_IDLE to RRC_CONNECTED, to achieve UL time synchronization for a UE.

MME centralizes all the communications informing that a portable device changes Tracking Area. In this way, MME can at all times determine the estimated number of portable devices in Idle mode, called "TA_Counter", within each Tracking Area. For updating the value TA_counter, the MME updates the number of portable devices in Idle mode under this Tracking Area taking into account the number of Tracking Area.

Figure 2:
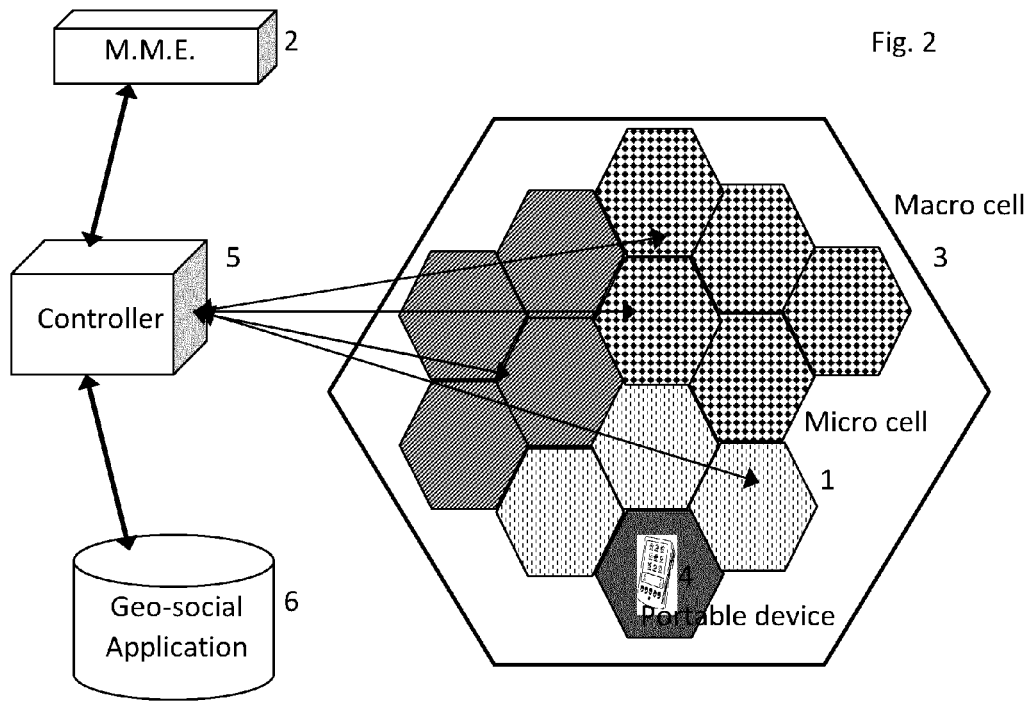
FIG. 2 illustrates the structure of the communication network to control the activity of each micro cell within a given macro cell.

FIG. 2 illustrates the structure of the various elements making it possible to control the activity of each micro cell 1 within a given macro cell 3. This activity depends in particular on the presence of portable devices 4 within each micro cell. A controller 5 is able to enter in communication with each eNodeB. This controller 5 may send a message of wake-up to a switched-off eNodeB, and a message of switch off. Controller 5 is also connected to the MME 2 and thus receives the number of portable devices in Idle mode present in each Tracking Area. the controller 5 may be for example a part of Radio Controller Network (RNC) or Serving GPRS Support Node (SGSN) or Home NodeB Gateway (HNB-GW) for WCDMA technology, or a part of MME or Home enhanced NodeB Gateway (HeNB-GW) for LTE technology.

Controller 5 is also connected to one or more applicative databases 6. These databases are hosted in one or more servers making it possible to deliver a service to users. These services are mainly local, for example: delivering of a ticket of transport within a station, indicating of the road traffic at a certain location, supplying of product within a store, use of the Global Positioning System (GPS) function, etc. These services proposed to the owner of the portable device are related to a determined location, so that when the service is required or delivered by the portable device, it is located with precision. This permits to have location information for both active and portable devices.

The controller 5 receives from MME information about the total number of portable devices in Idle mode within each Tracking Area, but the MME doesn't provide the number of portable devices in Idle mode within a micro cell. The estimation of number of portable devices in Idle mode sent by the eNodeB and the information provided by applicative databases 6 improve the reliability of this number at the level of each micro cell (eNodeB_counter).

When a portable device 4 moves, it need to ensure the continuity of its management so that it can constantly receive incoming calls and that it can possibly send some. So, the portable device in idle mode has to respect criteria of "cell reselection" to be attached to a new Tracking Area. When a cell reselection toward a micro cell has been decided, the portable device transmits a message of "location update" towards the micro cell. At the time of this message, the portable device performs a random request for access (UL random access attempt) towards the micro cell. Each micro cell counts the number of portable device having required to be relocated towards the Tracking Area comprising this micro cell and sends this number to controller 5. To improve the estimate of the number of portable devices in Idle mode by micro cell, the network may use an applicative server of geolocalisation which counts the number of portable devices in Active and Idle mode according to given areas. This number is transmitted to the controller 5 to update the counter (eNodeB_counter) of portables devices in idle mode for each micro cell.

Figure 3:
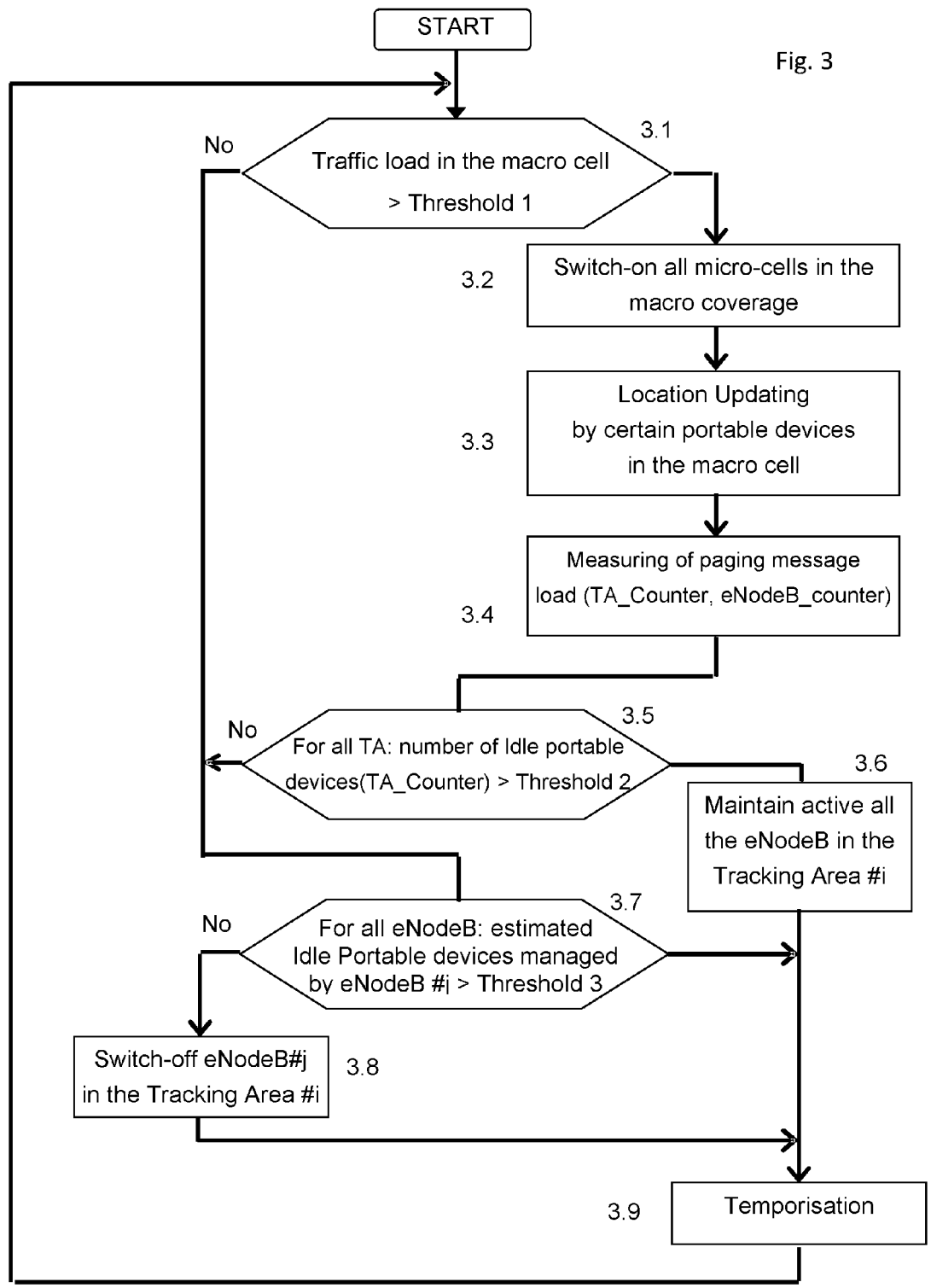
FIG. 3 is a flowchart illustrating example operation steps to optimize the number of switched-on eNodeBs in a communication network.

Thus, by using the number of portable devices in Idle mode in the Tracking Area provided by MME, the estimation of number of portable devices in Idle mode and information from the applicative databases, controller 5 is able to roughly determine the number of portable devices in Idle mode in each micro cell. The system described above according to a preferred embodiment will now be discussed in terms of function. A method making it possible to optimize the number of switched-on eNodeBs is illustrated by the flowchart of FIG. 3.

Initially (step 3.1), the activity at the level of a macro cell is estimated. This estimation is performed by comparing the load of current traffic of the macro cell with a determined value THRESHOLD 1. If this threshold is exceeded, then it needs to wake-up more micro cells to carry out the traffic.

At step 3.2, all the micro cells which were switched off in each Tracking Area are switched on. According to a variant, the method is performed one tracking Area after the other, and at each loop, all the micro cells of a determined Tracking Area are switched on. This switching on is advantageously triggered by a message broadcast to all the micro cells of the macro cell, those which are switched on does not change state. At the switching on, the eNodeB emits a radio signal called "Beacons signal". The portable devices detect the emission of new Beacon signal and determine this one getting the best level of quality. During step 3.3, so by receiving the Beacon signals, if the conditions of cell reselection are met, then the portable devices in Idle mode perform a "location update" towards new Tracking Area by carrying out a random access towards the micro cell. The procedures of cell reselection are well described by specifications "LTE Random Access procedure" and it is useless to explain them more. Other devices remain on the same Tracking Area because the conditions of cell reselection are not met.

At step 3.4, the controller determines for each micro cell the estimated number of portable devices in Idle mode: value eNodeB_counter. After the switching-on, the eNodeB counts the number of portable devices which request to be managed by it. The controller 5 also takes into account the information provided by the applicative database 6 for determining the number of portable devices in Idle mode in each micro cell. The MME updates TA_counter counting the number of portable devices which have selected each TA. The values eNodeB_Counter and TA_counter are transmitted to the controller 5.

Here how is calculated the eNodeB_counter value:

According to the statistical analysis of the network, one can determine a>1, such as the number of portable devices in Idle mode by micro cell is equal to: a×(number of UL RACH attempts), and according to the use of the application; one can determine a second number b<1 such as number of portable devices in Idle mode by micro cell=b× (number of portable devices either in active or in Idle mode determined by the application). At the end, the value eNodeB_counter is equal to the average of the numbers (a×nb_UL_RACH_attempt, b×nb_users_application).

Then, the controller 5 of network compares the number of portable devices 4 in Idle mode in each Tracking Area (TA_counter) with a threshold value THRESHOLD 2 (step 3.5). If this number is higher than the threshold, it is necessary to maintain switched-on all the eNodeB of corresponding Tracking Area so that all micro cells remain in an active state. In this case, the method does not optimize the number of wake-up eNodeBs because the current traffic requires leaving the eNodeB switching-on. At the step 3.6, all the eNodeBs in the corresponding Tracking Area remain switched-on.

On the other hand, if the value THRESHOLD 2 is not exceeded, it is possible to shutdown some eNodeBs. At step 3.7, for each micro cell of the Tracking Area, the estimation of number of portable devices in Idle mode (eNodeB_counter) is compared with a threshold value THRESHOLD 3. If the value THRESHOLD 3 is not exceeded, then the eNodeB can be shutdown because the potential need for traffic is not sufficient. If portable devices are in communication mode in the micro cell, then they perform a handover towards the macro cell which ensures the coverage for the hierarchical network.

At step 3.8, at least one eNodeB is switched-off. The corresponding Beacons Signal is not emitted more, then the few portables which were managed by it will search another Beacons signal and another corresponding micro cell or they will directly manage by the macro cell. At the end of these steps, the numbers of micro cells in active and inactive state are adapted to the current needs for traffic.

This situation lasts only a time and it is necessary to update this state at the end of a certain duration to periodically follow the evolutions of the requests for traffic. The method comprises a temporization step (step 3.9) at the end of which all the steps previously described (3.1 to 3.8) are re-run.

Figure 4:
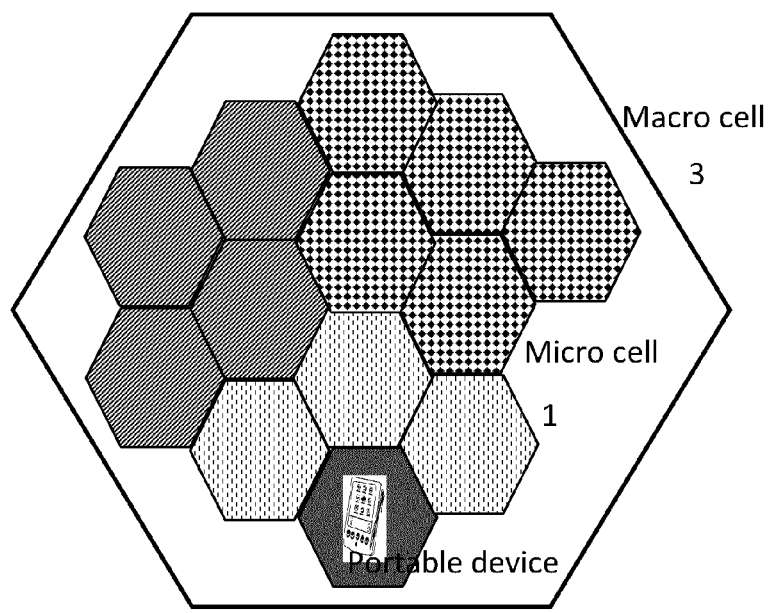
FIG. 4 illustrates a first structure of a macro cell comprising a plurality of Tracking Area
Figure 5:
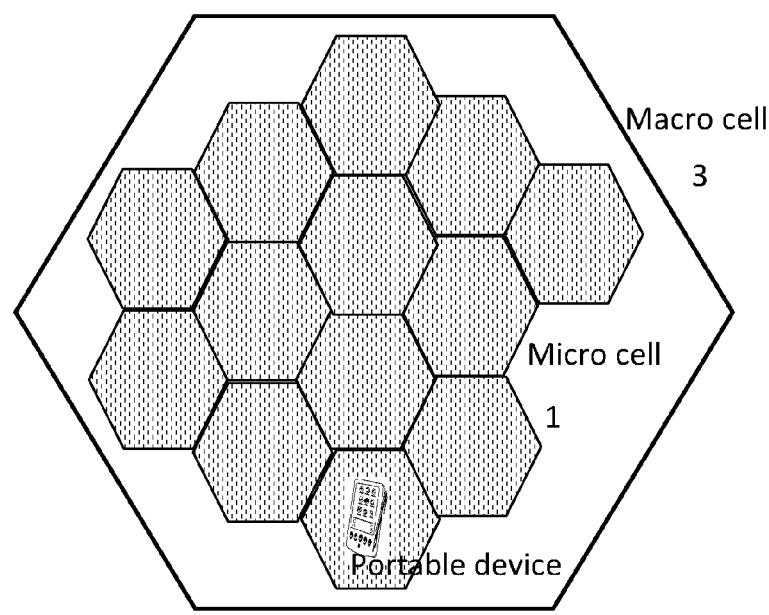
FIG. 5 illustrates a second structure of a macro cell comprising only one Tracking Area

According to a first variant of embodiment illustrated by FIG. 4, the macro cell contains a plurality of Tracking Area (TA). MME manages the information of the number of portable devices 4 in Idle mode in each TA. According to another variant of embodiment, illustrated by FIG. 5, all micro cells of the macro cell belong to the same Tracking Area. Then, MME contains only one number of portable devices in Idle mode for this macro.

Where a component is referred to above, unless otherwise indicated, reference to that component (including a reference to a "means") should be interpreted as a reference to any component which performs the function of the described component (i.e. is functionally equivalent to the described component), including components which are not structurally equivalent to the disclosed structure which performs the function in the illustrated exemplary embodiments of the invention.

Where a step in a method is referred to above, unless otherwise indicated, reference to that step should be interpreted as a reference to any step which achieves the same result as the step (i.e. is functionally equivalent to the described step), including steps which achieve a stated result in different ways from those disclosed in the illustrated exemplary embodiments of the invention. As will be apparent to those skilled in the art in the light of the foregoing disclosure, many alterations and modifications are possible in the practice of this invention

The invention claimed is:

1. A method to manage an energy mode of a plurality of micro base stations inside a mobile communications network, the network comprising at least one macro cell containing at least one Tracking Area covering a plurality of micro cells, each micro cell being associated with one of the plurality of micro base stations, wherein the method comprises:
   determining a current load of the macro cell,
   if the current load of the macro cell exceeds a first determined value, then switching on all the micro base stations associated with all the micro cells contained in said at least one Tracking Area of the macro cell,
   counting, for each micro base station, how many portable devices request be managed by each micro base station in response to the switching on of all the micro base stations, to determine a number of portable devices in an Idle mode on each micro cell inside said Tracking Area, and
   switching off at least one micro base station associated with at least one micro cell in the Tracking Area when the number of portable devices in Idle mode managed by the at least one micro base station is lower than a second determined value.

2. The method according to claim 1, wherein a number of idle and active portable devices managed by the at least one micro base station takes into account information of localization provided by applicative servers in communication with the portable devices located in the micro cell.

3. The method according to claim 1, wherein the macro cell contains only one Tracking Area.

4. The method according to claim 1, wherein the macro cell contains more than one Tracking Area, and the switching on of all the micro base stations contained in the Tracking Areas is successively performed for each Tracking Area.

5. The method according to claim 1, wherein the switching on of all the micro base stations contained in said Tracking Area is periodically performed, spaced by a regular time interval.

6. A controller of a mobile communications network for controlling traffic inside a macro cell, said controller being operative to communicate with a plurality of micro base stations each associated with a micro cell, the macro cell containing at least one Tracking Area covering a plurality of micro cells, wherein said controller is operative to:
   determine a current load of the macro cell,
   emit a first signal to switch on all of the micro base stations associated with all of the micro cells in said Tracking Area when the current load of the macro cell exceeds a first determined value,
   count, for each micro base station, how many portable devices request to be managed by each micro base station in response to the switching on of all the micro base stations, to determine a number of portable devices in an Idle mode in each micro cell inside said Tracking Area of the macro cell, and
   emit a second signal to switch off at least one micro base station associated with a micro cell of said Tracking Area, said second signal being emitted when the number of portable devices in Idle mode managed by the at least one micro base station is lower than a second determined value.

7. The controller according to claim 6, wherein said controller is further operative to communicate with applicative servers adapted to locate portable devices in each micro cell, and a determination by the controller of a number of idle and active portable devices managed in a given micro base station takes into account information of locating provided to said controller by said applicative servers.

8. The controller according to claim 6, wherein the macro cell managed by the controller contains only one Tracking Area.

9. The controller according to claim 6, wherein the macro cell managed by the controller contains more than one Tracking Area, said first signal being successively emitted for each Tracking Area.

10. The controller according to claim 6, wherein the first signal is emitted periodically, spaced by a regular time interval.

11. A non-transitory computer readable medium having thereon a computer program comprising computer-executable instructions for performing a method when the program is run on a network controller, the method comprising the steps according to claim 1.

* * * * *